United States Patent
Chen

(10) Patent No.: US 10,805,875 B2
(45) Date of Patent: Oct. 13, 2020

(54) METHOD AND APPARATUS FOR AUTOMATICALLY SELECTING NETWORK ACCORDING TO TARIFF, SERVER, AND TERMINAL

(71) Applicant: Huawei Technologies Co., Ltd., Shenzhen (CN)

(72) Inventor: Xi Chen, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/764,729

(22) PCT Filed: Sep. 29, 2015

(86) PCT No.: PCT/CN2015/091119
§ 371 (c)(1),
(2) Date: Mar. 29, 2018

(87) PCT Pub. No.: WO2017/054138
PCT Pub. Date: Apr. 6, 2017

(65) Prior Publication Data
US 2018/0288691 A1 Oct. 4, 2018

(51) Int. Cl.
*H04W 48/18* (2009.01)
*H04L 12/14* (2006.01)
(Continued)

(52) U.S. Cl.
CPC ............ *H04W 48/18* (2013.01); *H04L 12/14* (2013.01); *H04L 12/1439* (2013.01);
(Continued)

(58) Field of Classification Search
CPC ...... H04W 48/18; H04W 4/025; H04L 12/14; H04L 12/1439; H04L 12/1485;
(Continued)

(56) References Cited

U.S. PATENT DOCUMENTS 9,167,207 B1 * 10/2015 Drewry ................ H04N 7/1675
9,288,056 B1 * 3/2016 Spagnola ............ H04L 63/0823
(Continued)

FOREIGN PATENT DOCUMENTS

CN 1441588 A 9/2003
CN 102413547 A 4/2012
(Continued)

OTHER PUBLICATIONS

Google Scholar Search Results.*
(Continued)

*Primary Examiner* — Qun Shen
(74) *Attorney, Agent, or Firm* — Conley Rose, P.C.

(57) ABSTRACT

Embodiments of the present disclosure provide a method and apparatus for automatically selecting a network according to a tariff, a server, and a terminal. The method includes obtaining at least one available network access mode of a terminal; obtaining traffic tariff information of a user of the terminal; obtaining predicted Internet access duration and predicted Internet access traffic that are of the user of the terminal; and determining a network selection policy of the terminal according to the at least one available network access mode, the traffic tariff information of the user of the terminal, and the predicted Internet access duration and the predicted Internet access traffic that are of the user of the terminal. According to the method, the apparatus, the server, and the terminal in the embodiments of the present disclosure, Internet access costs of the user can be effectively controlled, and user experience can be improved.

20 Claims, 4 Drawing Sheets

(51) Int. Cl.
*H04M 15/00* (2006.01)
*H04W 4/02* (2018.01)
*H04W 88/06* (2009.01)

(52) U.S. Cl.
CPC ........ *H04L 12/1485* (2013.01); *H04M 15/00* (2013.01); *H04M 15/66* (2013.01); *H04M 15/8033* (2013.01); *H04M 15/8044* (2013.01); *H04M 15/8055* (2013.01); *H04M 15/8061* (2013.01); *H04W 4/025* (2013.01); *H04W 88/06* (2013.01)

(58) Field of Classification Search
CPC .. H04M 15/00; H04M 15/66; H04M 15/8033; H04M 15/8044; H04M 15/8055; H04M 15/8061
See application file for complete search history.

(56) References Cited

U.S. PATENT DOCUMENTS

| | | | |
|---|---|---|---|
| 2003/0072302 A1 | 4/2003 | Yakura | |
| 2004/0199631 A1* | 10/2004 | Natsume | H04L 67/18 709/225 |
| 2005/0216421 A1* | 9/2005 | Barry | G06F 11/0709 705/64 |
| 2010/0205191 A1* | 8/2010 | Meng | G06F 21/552 707/758 |
| 2011/0007630 A1* | 1/2011 | Almhana | H04L 41/0896 370/230 |
| 2012/0178412 A1* | 7/2012 | Yu | H04M 15/00 455/406 |
| 2013/0285855 A1* | 10/2013 | Dupray | G01S 19/48 342/451 |
| 2014/0010282 A1* | 1/2014 | He | H04L 65/4084 375/240.02 |
| 2014/0179266 A1* | 6/2014 | Schultz | H04W 4/24 455/406 |
| 2014/0301218 A1* | 10/2014 | Luo | H04L 41/5064 370/252 |
| 2014/0335820 A1* | 11/2014 | Zhang | H04L 12/1467 455/406 |
| 2015/0327132 A1* | 11/2015 | Shen | H04W 36/0083 370/252 |
| 2016/0212099 A1* | 7/2016 | Zou | H04L 63/0263 |
| 2016/0248915 A1 | 8/2016 | Zhang | |

FOREIGN PATENT DOCUMENTS

| | | |
|---|---|---|
| CN | 102572768 A | 7/2012 |
| CN | 102595562 A | 7/2012 |
| CN | 103096286 A | 5/2013 |
| CN | 103269504 A | 8/2013 |
| CN | 102572767 B | 9/2014 |
| CN | 104918203 A | 9/2015 |
| WO | 0065859 A1 | 11/2000 |
| WO | 2014163836 A1 | 10/2014 |

OTHER PUBLICATIONS

Machine Translation and Abstract of Chinese Publication No. CN102413547, Apr. 11, 2012, 16 pages.
Machine Translation and Abstract of Chinese Publication No. CN103096286, May 8, 2013, 14 pages.
Machine Translation and Abstract of International Publication No. WO2000065859, Nov. 2, 2000, 10 pages.
Foreign Communication From a Counterpart Application, PCT Application No. PCT/CN2015/091119, English Translation of International Search Report dated Jun. 29, 2016, 2 pages.
Foreign Communication From a Counterpart Application, PCT Application No. PCT/CN2015/091119, English Translation of Written Opinion dated Jun. 29, 2016, 4 pages.
Machine Translation and Abstract of Chinese Publication No. CN103269504, Aug. 28, 2013, 22 pages.
Machine Translation and Abstract of Chinese Publication No. CN104918203, Sep. 16, 2015, 13 pages.
Foreign Communication From a Counterpart Application, Chinese Application No. 201580050511.7, Chinese Office Action dated Mar. 13, 2019, 8 pages.
Machine Translation and Abstract of Chinese Publication No. CN102572767, Sep. 17, 2014, 16 pages.

* cited by examiner

METHOD AND APPARATUS FOR AUTOMATICALLY SELECTING NETWORK ACCORDING TO TARIFF, SERVER, AND TERMINAL

CROSS-REFERENCE TO RELATED APPLICATIONS

This application is a National Stage of International Application No. PCT/CN2015/091119, filed on Sep. 29, 2015, which is hereby incorporated by reference in its entirety.

TECHNICAL FIELD

Embodiments of the present disclosure relate to the field of communications technologies, and more specifically, to a method and apparatus for automatically selecting a network according to a tariff, a server, and a terminal.

BACKGROUND

An existing mobile terminal usually accesses the Internet by using a plurality of access modes such as a mobile communications network (2G/3G/4G) or a wireless local area network (WLAN).

For example, when a user has a free WLAN at home, the user usually accesses the Internet by using the free WLAN. When the user is in an area covered by a paid WLAN signal, the user may access the Internet by using the paid WLAN, or may access the Internet by using a data service.

Common Internet access charging methods include charging by time, charging by traffic, and differential charging by access destination. For a network service such as instant messaging, the network service needs to stay online but generates a relatively small volume of traffic. If the network service uses a connection that is charged by time, user costs may be excessively high. For a service that generates a relatively large volume of traffic, such as a video, if the service uses a connection that is charged by traffic, user costs may be excessively high.

To reduce costs, a user needs to manually switch between various networks, causing high inconvenience. If the user forgets to perform switching, for example, if the user is downloading a movie or browsing a web page when accessing the Internet by using a free WLAN at home but forgets to turn off a data service when leaving home, a large amount of mobile data traffic of the user may be consumed.

The foregoing mobile terminal often requires the user to manually switch between networks in a process of using a service and cannot effectively control Internet access costs of the user, and degrades user experience.

SUMMARY

Embodiments of the present disclosure provide a method and apparatus for automatically selecting a network according to a tariff, a server, and a terminal, so as to implement that a mobile terminal automatically selects a serving network according to a network usage status of a user and a network tariff.

An embodiment of the present disclosure provides a method for automatically selecting a network according to a tariff, including obtaining at least one available network access mode of a terminal; obtaining traffic tariff information of a user of the terminal; obtaining predicted Internet access duration and predicted Internet access traffic that are of the user of the terminal; and determining a network selection policy of the terminal according to the at least one available network access mode, the traffic tariff information of the user of the terminal, and the predicted Internet access duration and the predicted Internet access traffic that are of the user of the terminal, where the network selection policy is used to determine a network access mode of the terminal.

Another embodiment of the present disclosure provides an apparatus for automatically selecting a network according to a tariff, including a first obtaining unit configured to obtain at least one available network access mode of a terminal; a second obtaining unit configured to obtain traffic tariff information of a user of the terminal; a third obtaining unit configured to obtain predicted Internet access duration and predicted Internet access traffic that are of the user of the terminal; and a network selection policy generation unit configured to determine a network selection policy of the terminal according to the at least one available network access mode, the traffic tariff information of the user of the terminal, and the predicted Internet access duration and the predicted Internet access traffic that are of the user of the terminal, where the network selection policy is used to determine a network access mode of the terminal.

Another embodiment of the present disclosure provides a server, including a processor configured to obtain at least one available network access mode of a terminal; obtain traffic tariff information of a user of the terminal; obtain predicted Internet access duration and predicted Internet access traffic that are of the user of the terminal; and determine a network selection policy of the terminal according to the at least one available network access mode, the traffic tariff information of the user of the terminal, and the predicted Internet access duration and the predicted Internet access traffic that are of the user of the terminal, where the network selection policy is used to determine a network access mode of the terminal; and a transmitter configured to send the network selection policy to the terminal.

Another embodiment of the present disclosure provides a terminal, including at least two wireless communications modules configured to establish a wireless network connection, where each wireless communications module is corresponding to a network access mode; and a processor configured to obtain at least one available network access mode of the terminal; obtain traffic tariff information of a user of the terminal; obtain predicted Internet access duration and predicted Internet access traffic that are of the user of the terminal; determine a network selection policy of the terminal according to the at least one available network access mode, the traffic tariff information of the user of the terminal, and the predicted Internet access duration and the predicted Internet access traffic that are of the user of the terminal; and select, according to the network selection policy, one of the at least two wireless communications modules to establish a wireless network connection.

From the foregoing technical solutions provided in the embodiments of the present disclosure, it can be learned that according to the method, the apparatus, the server, and the terminal in the embodiments of the present disclosure, the network access mode of the terminal may be determined according to the network tariff and the network usage status of the user, thereby effectively controlling Internet access costs of the user and improving user experience.

BRIEF DESCRIPTION OF DRAWINGS

To describe the technical solutions in the embodiments of the present disclosure more clearly, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
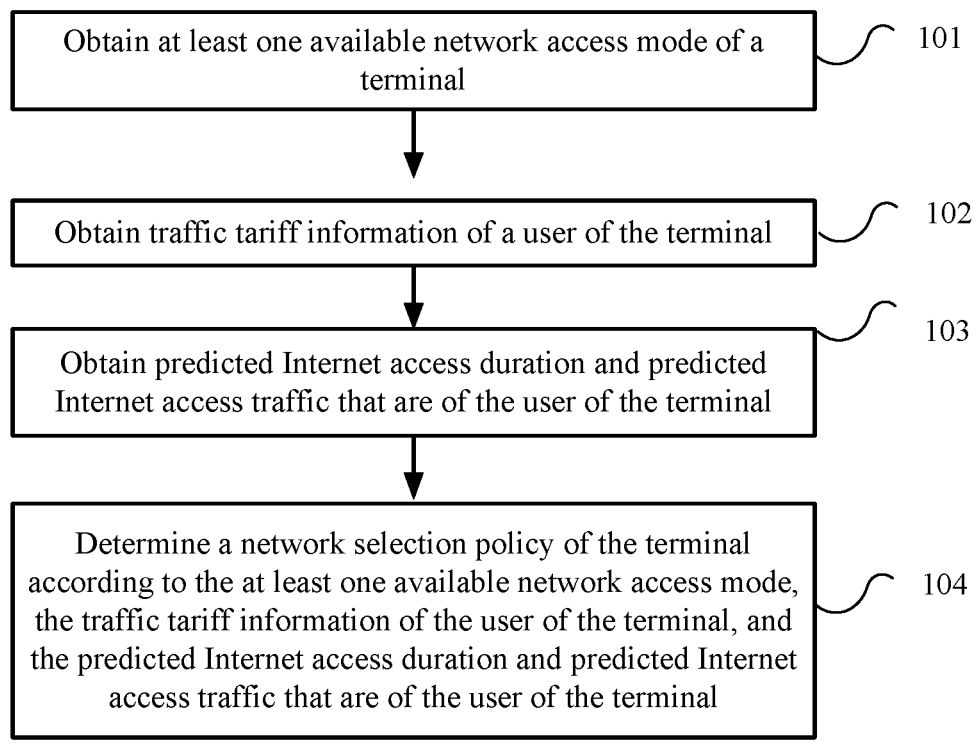
FIG. 1 is a flowchart of a method for automatically selecting a network according to a tariff according to an embodiment of the present disclosure.

FIG. 1 is a flowchart of a method for automatically selecting a network according to a tariff according to an embodiment of the present disclosure. The method provided in this embodiment may be applied to a terminal or a server. The terminal may be a communications device capable of accessing the Internet wirelessly, such as a mobile phone, a tablet computer, or a notebook computer. This is not limited in this embodiment of the present disclosure. Referring to FIG. 1, the method includes the following steps.

Step 101: Obtain at least one available network access mode of a terminal.

Currently, most mobile terminals, such as a mobile phone or a tablet computer, support a plurality of wireless access modes. Such a user terminal that supports a plurality of wireless access modes is also referred to as a multi-mode terminal. An advantage of the multi-mode terminal is that the multi-mode terminal can simultaneously support a plurality of access modes and adapt to a plurality of networks. Common wireless access modes include a mobile communications network (GSM, TD-SCDMA, WCDMA, TD-LTE, FDD-LTE, CDMA, CDMA EVDO, or the like), a WLAN, Bluetooth, and the like.

In an optional implementation of this embodiment, the terminal may determine an available network access mode by detecting signal strength of a wireless network. For example, the terminal detects a surrounding network signal, and determines whether strength of the network signal is greater than a specified threshold. If the signal strength is greater than the specified threshold, it indicates that quality of the current network signal is relatively good and a network is an available network.

In another optional implementation of this embodiment, the terminal may further determine an available network access mode by obtaining a network account and a password. For example, Wi-Fi signal access of an operator may be authenticated by means of entering a mobile phone number and a password. However, at a place such as a restaurant, a Wi-Fi network may be built by the restaurant, and a customer who accesses the Internet in the restaurant is notified, for free, of an Internet access password. If the terminal stores the Internet access password, the Wi-Fi network is an available network.

When the method provided in this embodiment is applied to the server, the server may obtain the at least one available network access mode of the terminal by receiving an available network access mode reported by the terminal, or may send an available network access mode request message to the terminal. After receiving the request message, the terminal sends an available network access mode to the server.

Step 102: Obtain traffic tariff information of a user of the terminal.

In an optional implementation of this embodiment, the traffic tariff information of the user of the terminal includes tariff information of an Internet access package, of an operator, to which the user of the terminal subscribes.

Different operators provide the user with different Internet access package services. Most general Internet access packages are in a monthly package form. For example, a data package of an operator network charges 30 Chinese yuan (CNY) a month for 500 MB domestic traffic and 0.29 CNY/MB for extra traffic. Traffic packages of some mobile communications networks provide a provincial traffic package and a domestic traffic package according to different use regions, and further provide an off-peak traffic package according to different traffic use time periods, for example, an off-peak package that charges 10 CNY for 1 GB provincial traffic, where an off-peak time is from 23:00 every day to 7:00 a next day.

A WLAN package may be in a duration package form, for example, charging 30 CNY a month for 15 hours and 0.05 CNY/minute for extra minutes. In addition, some Internet companies and operators cooperate to launch targeted traffic products, that is, binding a mobile phone client to a package product with monthly unlimited traffic or monthly limited traffic by using an Internet application service. For example, a user of an operator may subscribe to a traffic package of Xiami Music, where the traffic package charges 8 CNY/month and has an upper traffic limit of 6 GB.

In another optional implementation of this embodiment, the traffic tariff information of the user of the terminal further includes an available quota of the user. The available quota may be an available traffic quota or an available duration quota. For example, if the user already runs out of, in a current month, traffic in a package of 30 CNY a month for 500 M domestic traffic, the available quota is zero. If the user continues to use an Internet access service, the user is charged 0.29 CNY/MB. For another example, if the user already uses, in a current month, 10 hours in a WLAN package of 30 CNY a month for 15 hours, the available quota is 5 hours.

A user of the multi-mode terminal may subscribe to a plurality of Internet access packages. For example, a user of a multi-mode terminal that is compatible with a WLAN, the GSM, TD-SCDMA, and TD-LTE of China Mobile, and the GSM, WCDMA, TD-LTE, and FDD-LTE of China Unicom may simultaneously subscribe to a 4G Internet access package of China Mobile, a 4G Internet access package of China Unicom, a WLAN Internet access package of China Mobile, a WLAN Internet access package of China Unicom, and another targeted traffic package.

In this embodiment, the traffic tariff information of the user may be pre-generated and stored in a local storage medium or a server-side storage medium. This is not limited in this embodiment of the present disclosure.

Optionally, in this embodiment, traffic tariff information corresponding to the at least one available network access mode may be queried according to the at least one available network access mode in step 101, and tariff information of all Internet access packages to which the user subscribes may also be queried.

Step 103: Obtain predicted Internet access duration and predicted Internet access traffic that are of the user of the terminal.

Internet access behaviors of a user may show a certain regularity. That is, at an interval of a certain time, the user may have a same Internet access behavior in a certain time period or at a certain place. For example, during a workday, from 8:00 a.m. to 9:00 a.m., the user may access the Internet by using a mobile phone and use a news application to obtain information; during a noon break, the user may log in to an instant messaging or social application such as WeChat, QQ, or a microblog; from 5:00 p.m. to 7:00 p.m. in off hours, the user may query a relaxation service, a catering service, or the like by using an application, such as Dianping, in a large shopping mall; and from 9:00 p.m. to 10:00 p.m., the user may watch a video at home by using a video client such as Youku. With reference to a regularity characteristic of the Internet access behaviors of the user, traffic generated when the user accesses the Internet in a certain time period may be predicted, or traffic generated when the user accesses the Internet at a certain place and in a certain time period may be predicted.

In this embodiment, the predicted Internet access duration and the predicted Internet access traffic that are of the user of the terminal may be obtained by using networking usage parameters. The networking usage parameters may include an Internet access rate and an Internet access time period. For example, a database may be established to store the networking usage parameters. The networking usage parameters include information of the Internet access rate and the Internet access time period. Statistics may be collected, by using the networking usage parameters, on traffic generated when the user accesses the Internet in a certain time period.

In an optional implementation of this embodiment, a statistical period length of the networking usage parameters of the user may be a second, a minute, an hour, a day, a week, a month, a year, or the like. This is not limited in this embodiment of the present disclosure. Optionally, a statistical period of the networking usage parameters of the user may be set to a single workday, to analyze a network usage status of the user in the workday.

In another optional implementation of this embodiment, a statistical period of the networking usage parameters of the user may be alternatively set to a length of a World Cup football match (for example, from mid-June to mid-July) or a length of an NBA league (for example, from mid-April to mid-June). If the user is a sports fan, traffic consumed by the user watching a sporting event video in the statistical period increases.

In this embodiment, the networking usage parameters may come from a single user or a user group that includes a plurality of users. If the networking usage parameters of the single user are obtained, average Internet access traffic generated when the user accesses the Internet in a certain time period within the statistical period may be obtained. The predicted Internet access duration and the predicted Internet access traffic are obtained according to average Internet access traffic in each time period of the user within the statistical period.

If the networking usage parameters of the user group that includes a plurality of users are obtained, the user group may be categorized according to a user attribute. The user attribute may include an age, a gender, an occupation, a region, a hobby, or the like of a user. Networking usage parameters may be separately collected for a user group under each category, and an average Internet access rate of each user in a user group under each category in each time period may be calculated. Then, the predicted Internet access duration and the predicted Internet access traffic may be obtained according to a user group to which the user of the terminal belongs.

In this embodiment, statistics may be collected on an Internet access rate of the terminal in the following manner, obtaining an internet protocol (IP) address of the terminal; determining a size of a data packet that uses the IP address of the terminal as a source IP address or a destination IP address and that is transmitted by the terminal within a preset time length; and determining, according to the specified time length and the size of the data packet, an Internet access rate that is within the specified time length and that is corresponding to the IP address.

In this embodiment, statistics may be collected on an Internet access time period of the terminal in the following manner, obtaining an IP address of the terminal; determining a quantity of data packets that use the IP address of the terminal as a source IP address or a destination IP address and that are transmitted by the terminal within a time period T; and if the quantity of data packets is greater than a preset threshold, adding the time period T to the Internet access time period.

Optionally, in another optional implementation of this embodiment, the networking usage parameters further include at least one of geographical location information or accessed content information. If the networking usage parameters include the Internet access rate, the Internet access time period, and the geographical location information, statistics may be collected on data of an Internet access rate and an Internet access time period of a certain geographical location, to obtain predicted Internet access duration and predicted Internet access traffic that are corresponding to the geographical location. If the networking usage parameters include the Internet access rate, the Internet access time period, and the accessed content information, statistics may be collected on data of an Internet access rate and an Internet access time period of accessed content, to obtain predicted Internet access duration and predicted Internet access traffic that are corresponding to the accessed content. If the networking usage parameters include the Internet access rate, the Internet access time period, the geographical location information, and the accessed content information, statistics may be collected on data of an Internet access rate and an Internet access time period of certain accessed content at a certain geographical location, to obtain predicted Internet access duration and predicted Internet access traffic that are corresponding to the accessed content at the geographical location.

The geographical location information of the terminal may be obtained by using a GPS positioning technology, a Wi-Fi positioning technology, a base station positioning technology, or another positioning technology. This is not limited in this embodiment of the present disclosure. The GPS implements positioning depending on a GPS navigation satellite. For Wi-Fi positioning, a Wi-Fi hardware module is used to collect access point (AP) information by means of scanning, send the AP information to a positioning server, and receive location information from the positioning server, thereby implementing positioning. Base station positioning is similar to the Wi-Fi positioning. A 2G/3G/4G hardware module receives base station information; sends the base station information to a positioning server, where the positioning server completes positioning; and then receives location information sent by the positioning server. The terminal may also implement positioning by using an inertial navigation technology. That is, speed information of the terminal at each moment in a moving process is obtained by using an acceleration sensor and a gyroscope on the terminal, and if a start point of movement is known, a current location of the terminal is obtained by means of calculation.

Optionally, the geographical location information of the terminal may be at least one of a longitude, a latitude, or an altitude of the terminal. Optionally, the geographical location information of the terminal may be a specific place, such as a subway station, a shopping mall, a cinema, a restaurant, or a bus stop. Optionally, the geographical location information of the terminal may be area information. That is, a scope of activity places of the user within a period of time is taken as an area, for example, a work area, a living area, or a commute road.

Optionally, the geographical location information of the terminal is further used to determine the traffic tariff information of the user of the terminal. For example, it is determined, according to the geographical location information of the terminal, whether currently used Internet access traffic belongs to local traffic, provincial traffic, or domestic traffic.

Optionally, the terminal may obtain accessed content information of the user by obtaining an access IP and website URL information of the terminal or by parsing an IP data packet of an Internet access service. Optionally, a domain name keyword of a network accessed by the user is determined according to the website URL information, and the content information accessed when the user accesses the Internet is identified. For example, information of a website currently accessed by the user may be determined according to a domain name keyword sina, qq, or taobao of the Sina, Tencent, or Taobao website. A client used when the user accesses the Internet may be further identified, for example, a Youku client, a Taobao client, or a QQ client. A page capturing and text processing may be further performed for a web page corresponding to URL data, to obtain a category of content currently accessed by the user, for example, news, a video, or shopping.

Figure 3:
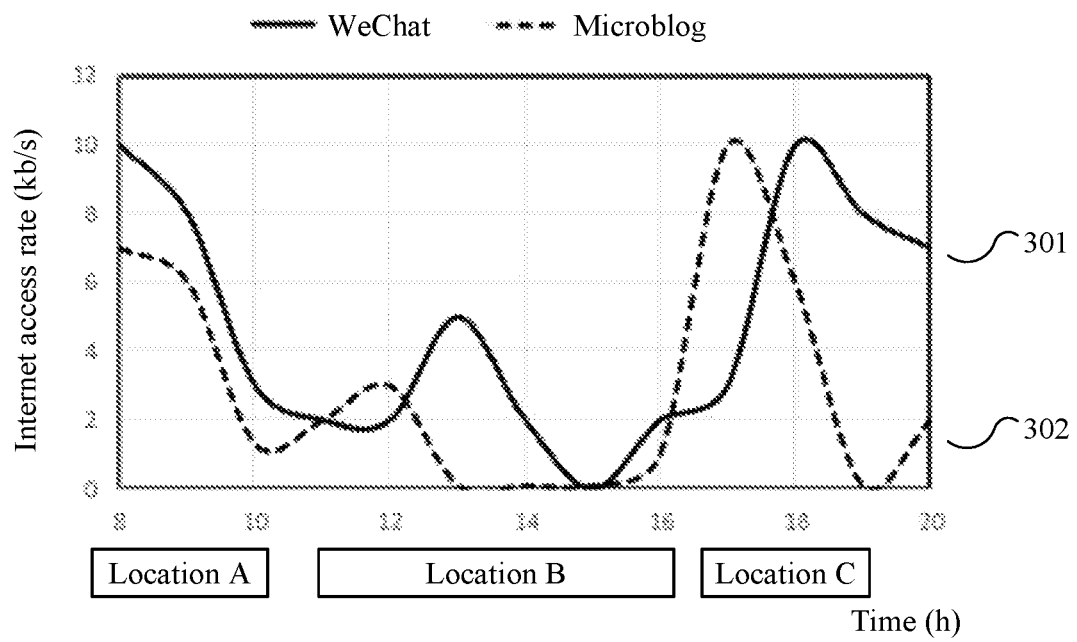
FIG. 3 is a schematic diagram of an Internet access rate of a user of a terminal changing with times and places according to an embodiment of the present disclosure.

FIG. 3 is a schematic diagram of an Internet access rate of a user changing with Internet access time periods and geographical locations according to this embodiment. Traffic generated when the user accesses certain network content is a function of an Internet access rate, a time, and a geographical location. A vertical axis represents the Internet access rate of the terminal, and a lateral axis represents the time and different geographical locations. This specific example collects statistics on networking usage parameters of the user from 8:00 a.m. to 8:00 p.m. Activity areas of the user during this period include three locations, a location A, a location B, and a location C. In this embodiment, Internet access time periods of the user may be divided into a commuting time period, an office time period, and an off-hours time period. Corresponding geographical locations also include three locations. The location A is a commute road, the location B is an office area, and the location C is a large shopping mall. Each Internet access time period includes a plurality of time slices and networking usage parameter samples.

A curve 301 represents a usage status of WeChat of the user, and a curve 302 represents a usage status of a microblog of the user. In FIG. 3, traffic consumed when the user uses WeChat in the commuting time period, a noon break time period, and the off-hours time period is relatively high, and traffic consumed when the user uses WeChat in morning and afternoon working hours is relatively low. Usage statuses of WeChat and the microblog of the user in workdays may show a certain periodicity. That is, time periods in which and frequency at which the user uses WeChat and the microblog from 8:00 a.m. to 8:00 p.m. every day during the workdays repeat. Therefore, statistics may be collected on usage statuses of WeChat and the microblog of the user in workdays in a week, to obtain average Internet access traffic generated when the user accesses WeChat or the microblog in a certain time period in each workday.

Step 104: Determine a network selection policy of the terminal according to the at least one available network access mode, the traffic tariff information of the user of the terminal, and the predicted Internet access duration and the predicted Internet access traffic that are of the user of the terminal.

Optionally, in this embodiment, the network selection policy may be determined according to a predicted Internet access fee of an available network access mode. That is, a predicted Internet access fee of the at least one available network access mode is calculated according to the at least one available network access mode, the traffic tariff information of the user of the terminal, and the predicted Internet access duration and the predicted Internet access traffic that are of the user of the terminal; and then, the network selection policy of the terminal is determined according to the predicted Internet access fee of the at least one available network access mode.

Optionally, in an optional implementation of this embodiment, a network access mode with a lowest predicted Internet access fee is selected from the at least one available network access mode as a network access mode of the terminal.

To further understand the present disclosure, the following further describes the foregoing method by using a specific example.

It is assumed that obtained available network access modes of a terminal A are 4G of an operator A, 4G of an operator B, and a WLAN of an operator C.

Traffic tariff information may include tariff information of an Internet access package, of an operator, to which a user of a terminal subscribes, and may further include an available quota. In an example in which traffic tariff information includes tariff information of an Internet access package of an operator and an available quota, traffic tariff information of a user of the terminal A is described in Table 1.

TABLE 1

| Network access mode | Package type | Package tariff | Available quota |
|---|---|---|---|
| 4G of the operator A | 4G domestic traffic of the operator A | 30 CNY for 500 M and 0.29 CNY/MB for extra traffic | 0 M |

TABLE 1-continued

| Network access mode | Package type | Package tariff | Available quota |
| --- | --- | --- | --- |
| 4G of the operator B | 4G provincial traffic of the operator B | 10 CNY for 500 M and 0.2 CNY/MB for extra traffic | 200 M |
| | 4G Youku provincial targeted traffic package of the operator B | 10 CNY for 1 G | 500 M |
| WLAN of the operator A | WLAN of the operator A | 30 CNY for 30 hours and 0.05 CNY/minute for extra minutes | 10 hours |
| WLAN of the operator C | WLAN of the operator C | 20 CNY for 12 hours | 2 hours |

For example, it is assumed that when the user accesses the Internet by using WeChat in a province to which a number of an operator B belongs, obtained predicted Internet access duration of the user is 1 hour, and obtained predicted Internet access traffic of the user is 10 MB. Predicted Internet access fees of available network access modes obtained by means of calculation according to Table 1 are described in Table 2.

TABLE 2

| Available network access mode | Predicted Internet access fee |
| --- | --- |
| 4G of the operator A | 2.9 CNY |
| 4G of the operator B | 0.2 CNY |
| WLAN of the operator C | 1.67 CNY |

Therefore, in this embodiment, the terminal A selects a network access mode with a lowest predicted Internet access fee, that is, the 4G network of the operator B, to perform access.

For another example, it is assumed that when the user accesses the Internet by using Youku in a province to which a number of an operator B belongs, obtained predicted Internet access duration of the user is 1 hour, and obtained predicted Internet access traffic of the user is 300 MB. Predicted Internet access fees of available network access modes obtained by means of calculation according to Table 1 are described in Table 3.

TABLE 3

| Available network access mode | Predicted Internet access fee |
| --- | --- |
| 4G of the operator A | 87 CNY |
| 4G of the operator B | 2.93 CNY |
| WLAN of the operator C | 1.67 CNY |

Therefore, in this embodiment, the terminal A selects a network access mode with a lowest predicted Internet access fee, that is, the WLAN network of the operator C, to perform access.

In another optional implementation of this embodiment, the network selection policy may be determined according to a factor such as radio frequency power consumption or network service quality.

The radio frequency power consumption is power consumption of a radio frequency front-end of the terminal. The radio frequency front-end mainly includes a radio frequency transceiver. The radio frequency front-end mainly processes a high-frequency analog signal, is responsible for a terminal communication task, needs to intermittently communicate with a base station to ensure signal unblocking for the terminal, and is a main power-consuming unit of the terminal. The power consumption of the radio frequency front-end is related to a network access mode and a type (for example, audio, a video, or voice) of content accessed by the terminal. For example, a voice service of a 2G network may have highest efficiency, and a voice service of a 4G network may require a more complex authentication and connection negotiation process and therefore consumes more electric energy. However, a data transmission service of the 4G network is faster and more efficient than a data transmission service of the 2G network, and has relatively low energy consumption.

Optionally, to measure the power consumption of the radio frequency front-end, a voltage and a current of the radio frequency front-end within a transmission time period may be sampled to obtain power consumption of the radio frequency front-end in a unit time. For each type of accessed content, the power consumption of the radio frequency front-end in a unit time differs in different network access modes.

The network service quality also affects communication efficiency of the terminal, and therefore may be used as a factor for determining the network selection policy. Optionally, in this embodiment, network service quality parameters include a delay, a jitter, a packet loss rate, and bandwidth.

In an optional implementation of this embodiment, a network access mode of the terminal may be determined according to the predicted Internet access fee of the at least one available network access mode, the radio frequency power consumption, and the network service quality. For example, for each type of accessed content, the delay is selected to represent the network service quality; a predicted Internet access fee, the radio frequency power consumption, and the delay are used as network selection parameters; a weight value corresponding to each network selection parameter is determined according to a user policy; a weighted sum is calculated and used as a network decision indicator; and the network selection policy is determined according to network decision indicator values corresponding to various network access modes. A network decision indicator value of the $i^{th}$ network access mode is:

$$U_i = \sum_{j=1}^{3} \omega_j X_{ij}, i = 1, 2, \ldots, M,$$

where $U_i$ is the network decision indicator value of the $i^{th}$ network access mode, $X_{ij}$ is a normalized value of the $j^{th}$ network selection parameter of the $i^{th}$ to-be-selected network, $\omega_j$ is a weight value corresponding to the $j^{th}$ network selection parameter value, M is a quantity of available network access modes, and a network with a smallest $U_i$ is selected as an access network.

In another optional implementation of this embodiment, a network access mode may be determined according to the radio frequency power consumption alone. The power consumption of the radio frequency front-end in a unit time may be used as a network access mode selection weight and recorded as a radio frequency power consumption selection weight. A smaller weight value indicates a higher priority of selecting such a network access mode. For example, for a voice service, selection weights of 2G, 3G, and 4G network access modes are 20%, 30%, and 50% respectively.

In another optional implementation of this embodiment, a network access mode may be determined according to the network service quality alone. For example, for a streaming media service, the delay may be used as a network access mode selection weight and recorded as a delay selection weight. A smaller weight value indicates a higher priority of selecting such a network access mode. For example, for the streaming media service, selection weights of 2G, 3G, and 4G network access modes are 70%, 20%, and 10% respectively.

In another optional implementation of this embodiment, the network selection policy may be determined according to a combination of a predicted Internet access fee, the radio frequency power consumption, and the network service quality. For example, the predicted Internet access fee and a radio frequency power consumption selection weight may be multiplied by a delay selection weight. A smaller product indicates a higher priority of selecting such a network access mode.

According to the method provided in this embodiment of the present disclosure, the network access mode of the terminal is determined according to a network tariff and a network usage status of the user, thereby effectively controlling Internet access costs of the user and improving user experience.

Figure 2:
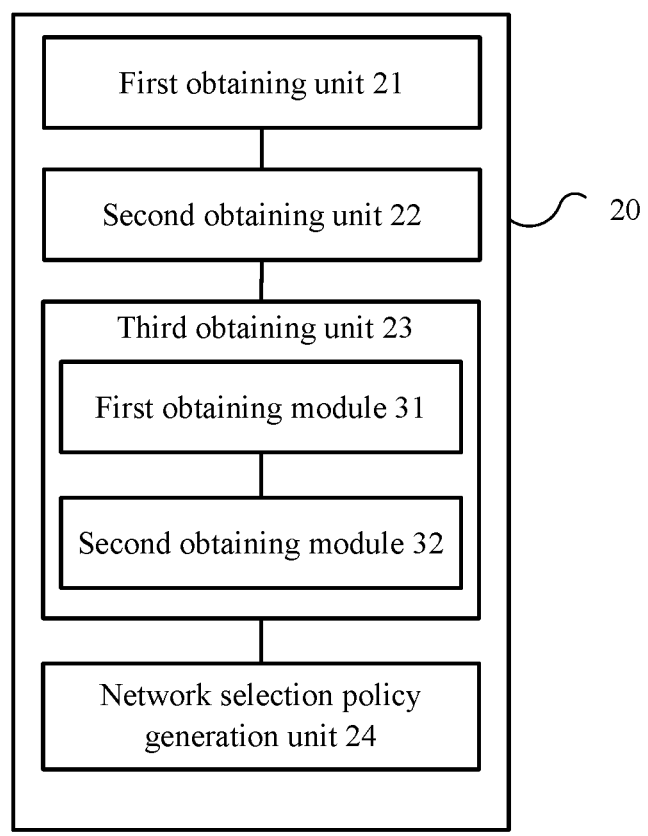
FIG. 2 is a composition block diagram of an apparatus for automatically selecting a network according to a tariff according to an embodiment of the present disclosure.

FIG. 2 is a composition block diagram of an apparatus 20 for automatically selecting a network according to a tariff according to an embodiment of the present disclosure. Referring to FIG. 2, the apparatus 20 includes a first obtaining unit 21 configured to obtain at least one available network access mode of a terminal; a second obtaining unit 22 configured to obtain traffic tariff information of a user of the terminal; a third obtaining unit 23 configured to obtain predicted Internet access duration and predicted Internet access traffic that are of the user of the terminal; and a network selection policy generation unit 24 configured to determine a network selection policy of the terminal according to the at least one available network access mode obtained by the first obtaining unit 21, the traffic tariff information of the user of the terminal that is obtained by the second obtaining unit 22, and the predicted Internet access duration and the predicted Internet access traffic that are of the user of the terminal and that are obtained by the third obtaining unit 23, where the network selection policy is used to determine a network access mode of the terminal.

Optionally, the third obtaining unit 23 further includes a first obtaining module 31 and a second obtaining module 32. The first obtaining module 31 is configured to obtain networking usage parameters, where the networking usage parameters include an Internet access rate and an Internet access time period. The second obtaining module 32 is configured to obtain, according to the networking usage parameters, the predicted Internet access duration and the predicted Internet access traffic that are of the user of the terminal.

Optionally, the networking usage parameters obtained by the first obtaining module 31 further include geographical location information, and the second obtaining module 32 is configured to obtain, according to the networking usage parameters, the predicted Internet access duration and the predicted Internet access traffic that are of the user of the terminal and that are corresponding to the geographical location information.

Optionally, the networking usage parameters obtained by the first obtaining module 31 further include accessed content information, and the second obtaining module 32 is configured to obtain, according to the networking usage parameters, the predicted Internet access duration and the predicted Internet access traffic that are of the user of the terminal and that are corresponding to the accessed content information.

In this embodiment, the network selection policy generation unit 24 is configured to calculate a predicted Internet access fee of the at least one available network access mode according to the at least one available network access mode obtained by the first obtaining unit 21, the traffic tariff information of the user of the terminal that is obtained by the second obtaining unit 22, and the predicted Internet access duration and the predicted Internet access traffic that are of the user of the terminal and that are obtained by the third obtaining unit 23; and then determine the network selection policy of the terminal according to the predicted Internet access fee of the at least one available network access mode.

In an optional implementation of this embodiment, the network selection policy generation unit 24 is configured to select a network access mode with a lowest predicted Internet access fee from the at least one available network access mode, as the network access mode of the terminal.

In another optional implementation of this embodiment, the network selection policy generation unit 24 is configured to determine the network access mode of the terminal according to the predicted Internet access fee of the at least one available network access mode, radio frequency power consumption, and network service quality.

The apparatus provided in this embodiment of the present disclosure determines the network access mode of the terminal according to a network tariff and a network usage status of the user, thereby effectively controlling Internet access costs of the user and improving user experience.

Content, such as information exchange and an execution process, between the modules in the foregoing apparatus is based on a same idea as the method embodiment of the present disclosure. Therefore, for detailed content, reference may be made to descriptions in the method embodiment of the present disclosure, and details are not described herein.

Figure 4:
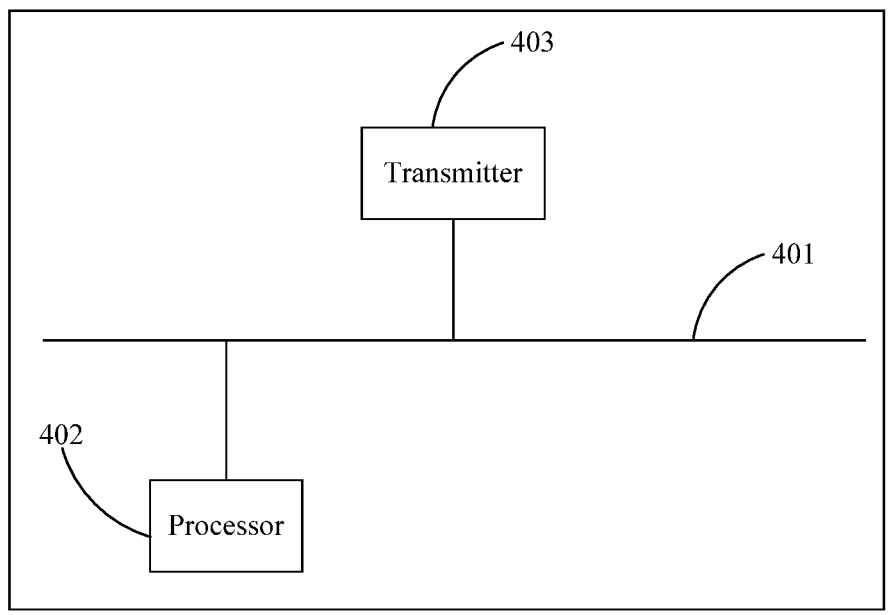
FIG. 4 is a schematic structural diagram of a server according to an embodiment of the present disclosure.

FIG. 4 is a schematic structural diagram of a server according to an embodiment of the present disclosure. Referring to FIG. 4, the server includes a processor 402 configured to obtain at least one available network access mode of a terminal; obtain traffic tariff information of a user of the terminal; obtain predicted Internet access duration and predicted Internet access traffic that are of the user of the terminal; and determine a network selection policy of the terminal according to the at least one available network access mode, the traffic tariff information of the user of the terminal, and the predicted Internet access duration and the predicted Internet access traffic that are of the user of the terminal, where the network selection policy is used to determine a network access mode of the terminal; and a transmitter 403 configured to send the network selection policy to the terminal.

The following describes each composition component of the server with reference to FIG. 4.

A communications bus 401 is configured to implement a connection and communication between the processor 402 and the transmitter 403.

Optionally, in this embodiment, the server may obtain the at least one available network access mode of the terminal by receiving information of an available network access mode that is reported by the terminal, or may send an available network access mode request message to the terminal. After receiving the request message, the terminal sends an available network access mode to the server.

Optionally, the processor 402 obtains the traffic tariff information of the user of the terminal by accessing a local memory of the terminal or a server in a network.

Optionally, the processor 402 obtains networking usage parameters, and obtains, according to the networking usage parameters, the predicted Internet access duration and the predicted Internet access traffic that are of the user of the terminal, where the networking usage parameters include an Internet access rate and an Internet access time period.

In an optional implementation of this embodiment, the server may obtain the networking usage parameters by means of reporting by the terminal, or may send a networking usage parameter request message to the terminal. After receiving the request message, the terminal sends the networking usage parameters to the server.

In another optional implementation of this embodiment, the server may obtain the networking usage parameters by accessing a server in a network or another terminal in a network.

Optionally, the networking usage parameters further include geographical location information, and the processor 402 is configured to obtain, according to the networking usage parameters, the predicted Internet access duration and the predicted Internet access traffic that are of the user of the terminal and that are corresponding to the geographical location information.

Optionally, the networking usage parameters further include accessed content information, and the processor 402 is configured to obtain, according to the networking usage parameters, the predicted Internet access duration and the predicted Internet access traffic that are of the user of the terminal and that are corresponding to the accessed content information.

Optionally, in this embodiment, the processor 402 is configured to calculate a predicted Internet access fee of the at least one available network access mode according to the at least one available network access mode, the traffic tariff information of the user of the terminal, and the predicted Internet access duration and the predicted Internet access traffic that are of the user of the terminal; and determine the network selection policy of the terminal according to the predicted Internet access fee of the at least one available network access mode.

Optionally, in this embodiment, the processor 402 is configured to select a network access mode with a lowest predicted Internet access fee from the at least one available network access mode, as the network access mode of the terminal; or determine the network access mode of the terminal according to the predicted Internet access fee of the at least one available network access mode, radio frequency power consumption, and network service quality.

The server provided in this embodiment of the present disclosure may determine the network access mode of the terminal according to a network tariff and a network usage status of the user, thereby effectively controlling Internet access costs of the user and improving user experience.

Figure 5:
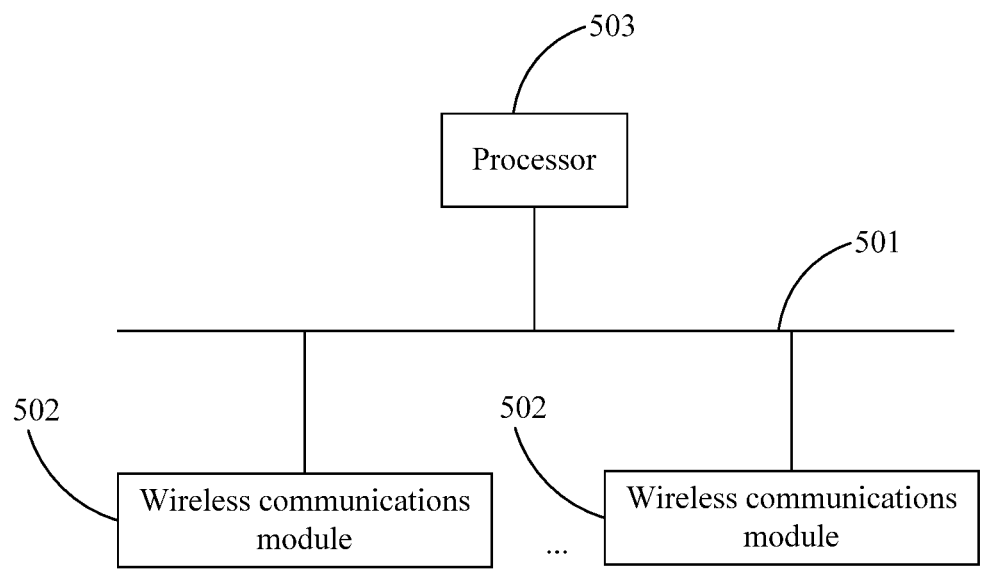
FIG. 5 is a schematic structural diagram of a terminal according to an embodiment of the present disclosure.

FIG. 5 is a schematic structural diagram of a terminal according to an embodiment of the present disclosure. In this embodiment of the present disclosure, the terminal may be a computer system in a handheld form, for example, a smartphone, a tablet computer, a personal digital assistant (PDA), a mobile Internet device (MID), or a wearable device. As shown in FIG. 5, the terminal may include at least one processor (for example, a central processing unit (CPU)), wireless communications modules, and at least one communications bus. A person skilled in the art may understand that a structure of the terminal shown in FIG. 5 does not constitute a limitation on an electronic device. The terminal may include components more or fewer than those shown in the figure, or in the terminal, some components are combined, or the components are disposed differently.

The following describes each composition component of the terminal with reference to FIG. 5.

The communications bus 501 is configured to implement connections and communication between the processor and the wireless communications modules.

The terminal includes at least two wireless communications modules 502. The wireless communications modules may be Wi-Fi modules, Bluetooth modules, 3G/4G modules, or the like.

The wireless communications modules 502 may be configured to connect to a WLAN network or a cellular network. A plurality of wireless data communications standards, such as the IEEE 802.11 WLAN standard, the IEEE 802.15 WPAN standard, and the 3GPP standard, may be used for a wireless adapter. A frequency of an antenna system and a used wireless data communications standard may be adjusted by means of software programming on an emitter and receiver system of the wireless communications modules.

The processor 503 is a control center of the terminal, is connected to each part of the entire terminal by using various interfaces and lines, and performs various functions of the terminal and data processing by running or executing a software program and/or an application unit that is stored in a memory and invoking data stored in the memory, so as to perform overall monitoring on the terminal.

In an embodiment of the terminal, as shown in FIG. 5, the terminal includes the at least two wireless communications modules 502 configured to establish a wireless network connection, where each wireless communications module is corresponding to a network access mode; and the processor 503 configured to obtain at least one available network access mode of the terminal; obtain traffic tariff information of a user of the terminal; obtain predicted Internet access duration and predicted Internet access traffic that are of the user of the terminal; determine a network selection policy of the terminal according to the at least one available network access mode, the traffic tariff information of the user of the terminal, and the predicted Internet access duration and the predicted Internet access traffic that are of the user of the terminal; and select, according to the network selection policy, one of the at least two wireless communications modules to establish a wireless network connection.

In an optional implementation of this embodiment, the processor 503 is configured to determine an available network access mode according to various indicators of a wireless network signal that are detected by a radio frequency front-end, where the indicators of the wireless network signal may be received signal strength, a bit error rate, a signal-to-noise ratio, and the like. For example, the radio frequency front-end detects an indicator of a surrounding wireless network signal, and the processor 503 determines whether strength of the network signal is greater than a specified threshold. If the signal strength is greater than the specified threshold, it indicates that quality of the current network signal is relatively good and a network is an available network.

In another optional implementation of this embodiment, the processor 503 may be further configured to determine an available network access mode by obtaining a network account and a password of a user. For example, Wi-Fi signal access of an operator may be authenticated by means of entering a mobile phone number and a password. However, at a place such as a restaurant, a Wi-Fi network may be built by the restaurant, and a customer who accesses the Internet in the restaurant is notified, for free, of an Internet access password. If the terminal stores the Internet access password, the Wi-Fi network is an available network.

Optionally, in this embodiment, the processor 503 obtains the traffic tariff information of the user of the terminal by accessing a local storage medium of the terminal or a server-side storage medium. This is not limited in this embodiment of the present disclosure.

Optionally, in this embodiment, the processor 503 obtains networking usage parameters, and obtains, according to the networking usage parameters, the predicted Internet access duration and the predicted Internet access traffic that are of the user of the terminal, where the networking usage parameters include an Internet access rate and an Internet access time period.

Optionally, in an optional implementation of this embodiment, the networking usage parameters further include geographical location information, and the processor 503 is configured to obtain, according to the networking usage parameters, the predicted Internet access duration and the predicted Internet access traffic that are of the user of the terminal and that are corresponding to the geographical location information.

Optionally, in another optional implementation of this embodiment, the networking usage parameters further include accessed content information, and the processor 503 is configured to obtain, according to the networking usage parameters, the predicted Internet access duration and the predicted Internet access traffic that are of the user of the terminal and that are corresponding to the accessed content information.

The geographical location information may be obtained by using a GPS positioning technology, a Wi-Fi positioning technology, a base station positioning technology, or another positioning technology. This is not limited in this embodiment of the present disclosure. The GPS implements positioning depending on that a GPS module of the terminal receives a GPS signal of a GPS navigation satellite. For Wi-Fi positioning, a Wi-Fi hardware module is used to collect AP information by means of scanning, send the AP information to a positioning server, and receive location information from the positioning server, thereby implementing positioning. Base station positioning is similar to the Wi-Fi positioning. A 2G/3G/4G hardware module receives base station information; sends the base station information to a positioning server, where the positioning server completes positioning; and then receives location information sent by the positioning server. The terminal may also implement positioning by using an inertial navigation technology. That is, speed information of the terminal at each moment in a moving process is obtained by using an acceleration sensor and a gyroscope on the terminal, and if a start point of movement is known, a current location of the terminal is obtained by means of calculation.

Optionally, in this embodiment, the processor 503 is configured to calculate a predicted Internet access fee of the at least one available network access mode according to the at least one available network access mode, the traffic tariff information of the user of the terminal, and the predicted Internet access duration and the predicted Internet access traffic that are of the user of the terminal; and determine the network selection policy of the terminal according to the predicted Internet access fee of the at least one available network access mode.

Optionally, in this embodiment, the processor 503 is configured to select a network access mode with a lowest predicted Internet access fee from the at least one available network access mode, as the network access mode of the terminal; or determine the network access mode of the terminal according to the predicted Internet access fee of the at least one available network access mode, radio frequency power consumption, and network service quality.

In this embodiment of the present disclosure, the network access mode of the terminal is determined according to a network tariff and a network usage status of the user, thereby effectively controlling Internet access costs of the user and improving user experience.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments may be included. The foregoing storage medium may be a magnetic disk, an optical disc, a read-only memory (ROM), a random access memory (RAM), or the like.

Specific examples are used in this specification to describe the principle and implementations of the present disclosure. The descriptions of the foregoing embodiments are merely intended to help understand the method and idea of the present disclosure. In addition, with respect to the specific implementations and the application scope, modifications may be made by a person of ordinary skill in the art according to the idea of the present disclosure. Therefore, content of this specification shall not be construed as a limitation on the present disclosure.

What is claimed is:

1. A method for automatically selecting a network according to a tariff, wherein the method comprises:
    obtaining an available network access mode of a terminal;
    obtaining traffic tariff information of a user of the terminal;
    obtaining networking usage parameters based on an internet access pattern of the user in a certain period of time, wherein the networking usage parameters comprise an Internet access rate, an Internet access time period, and geographical location information of the terminal;
    obtaining, according to the networking usage parameters, predicted Internet access duration and predicted Internet access traffic corresponding to the geographical location information of the user of the terminal; and
    determining a network selection policy of the terminal according to the available network access mode, the traffic tariff information, the predicted Internet access duration, and the predicted Internet access traffic, wherein the network selection policy is used to determine a network access mode of the terminal,
    wherein determining the network selection policy further comprising determining the network selection policy according to a network decision indicator value of the available network access mode of the terminal, wherein the network decision indicator value of an $i^{th}$ network access mode is calculated as $$U_i = \sum_{j=1}^{3} \omega_j X_{ij}, i = 1, 2, \ldots, M,$$

wherein $U_i$ is the network decision indicator value of the $i^{th}$ network access mode, wherein $X_{ij}$ is a normalized value of the $j^{th}$ network selection parameter of the $i^{th}$ to-be-selected network, wherein $\omega_j$ is a weight value corresponding to the $i^{th}$ network selection parameter value, wherein M is a quantity of available network access modes, and wherein a network with a smallest $U_i$ is selected as an access network.

2. The method of claim 1, wherein the networking usage parameters further comprise accessed content information, and wherein the method further comprises obtaining, according to the networking usage parameters, the predicted Internet access duration and the predicted Internet access traffic based on the accessed content information.

3. The method of claim 1, wherein determining a network selection policy of the terminal comprises:
calculating a predicted Internet access fee of the available network access mode based on the available network access mode, the traffic tariff information, the predicted Internet access duration, and the predicted Internet access traffic; and
determining the network selection policy of the terminal according to the predicted Internet access fee of the available network access mode.

4. The method of claim 3, wherein determining the network selection policy of the terminal comprises:
selecting a network access mode with a lowest predicted Internet access fee from the available network access mode as the network access mode of the terminal; or
determining the network access mode of the terminal according to the predicted Internet access fee of the available network access mode, radio frequency power consumption, and network service quality.

5. A server comprising:
a hardware processor configured to:
obtain an available network access mode of a terminal;
obtain traffic tariff information of a user of the terminal;
obtain networking usage parameters based on an internet access pattern of the user in a certain period of time, wherein the networking usage parameters comprise an Internet access rate, an Internet access time period, and geographical location information of the terminal;
obtain, according to the networking usage parameters, predicted Internet access duration and predicted Internet access traffic corresponding to the geographical location information of the user of the terminal; and
determine a network selection policy of the terminal according to the available network access mode, the traffic tariff information, the predicted Internet access duration, and the predicted Internet access traffic, wherein the network selection policy is used to determine a network access mode of the terminal, wherein in a manner to determine the network selection policy, the processor is further configured to determine the network selection policy according to a network decision indicator value of the available network access mode of the terminal, wherein the network decision indicator value of an $i^{th}$ network access mode is calculated as $$U_i = \sum_{j=1}^{3} \omega_j X_{ij}, i = 1, 2, \ldots, M,$$

wherein $U_i$ is the network decision indicator value of the $i^{th}$ network access mode, wherein $X_{ij}$ is a normalized value of the $j^{th}$ network selection parameter of the $i^{th}$ to-be-selected network, wherein $\omega_j$ is a weight value corresponding to the jth network selection parameter value, wherein M is a quantity of available network access modes, and wherein a network with a smallest $U_i$ is selected as an access network; and
a transmitter coupled to the hardware processor and configured to send the network selection policy to the terminal.

6. The server of claim 5, wherein the networking usage parameters further comprise accessed content information, and wherein the processor is further configured to: obtain, according to the networking usage parameters, the predicted Internet access duration and the predicted Internet access traffic based on the accessed content information.

7. The server of claim 5, wherein the processor is further configured to:
calculate a predicted Internet access fee of the available network access mode based on the available network access mode, the traffic tariff information, the predicted Internet access duration, and the predicted Internet access traffic; and
determine the network selection policy of the terminal according to the predicted Internet access fee of the at least one available network access mode.

8. The server of claim 7, wherein the processor is further configured to select a network access mode with a lowest predicted Internet access fee from the available network access mode as the network access mode of the terminal.

9. A terminal comprising:
a hardware processor configured to:
obtain an available network access mode of the terminal;
obtain traffic tariff information of a user of the terminal;
obtain networking usage parameters based on an internet access pattern of the user in a certain period of time, wherein the networking usage parameters comprise an Internet access rate, an Internet access time period, and geographical location information of the terminal;
obtain, according to the networking usage parameters, predicted Internet access duration and predicted Internet access traffic corresponding to the geographical location information of the user of the terminal;
determine a network selection policy of the terminal according to the available network access mode, the traffic tariff information, the predicted Internet access duration, and the predicted Internet access traffic, wherein in a manner to determine the network selection policy, the processor is further configured to determine the network selection policy according to a network decision indicator value of the available network access mode of the terminal, wherein the network decision indicator value of an $i^{th}$ network access mode is calculated as $$U_i = \sum_{j=1}^{3} \omega_j X_{ij}, i = 1, 2, \ldots, M,$$

wherein $U_i$ is the network decision indicator value of the $i^{th}$ network access mode, wherein $X_{ij}$ is a normalized value of the $j^{th}$ network selection parameter of the $i^{th}$ to-be-selected network, wherein $\omega_j$ is a weight value corresponding to the jth network selection parameter value, wherein M is a quantity of available network access modes, and wherein a network with a smallest $U_i$ is selected as an access network; and select, according to the network selection policy, a network access mode to establish a wireless network connection.

10. The terminal of claim 9, wherein the networking usage parameters further comprise accessed content information, and wherein the processor is further configured to obtain, according to the networking usage parameters, the predicted Internet access duration and the predicted Internet access traffic based on the accessed content information.

11. The terminal of claim 9, wherein the processor is further configured to:
calculate a predicted Internet access fee of the available network access mode based on the available network access mode, the traffic tariff information, the predicted Internet access duration, and the predicted Internet access traffic; and
determine the network selection policy of the terminal according to the predicted Internet access fee of the available network access mode.

12. The terminal of claim 11, wherein the processor is further configured to select a network access mode with a lowest predicted Internet access fee from the available network access mode, as the network access mode of the terminal.

13. The terminal of claim 11, wherein the processor is further configured to determine the network access mode of the terminal according to the predicted Internet access fee of the available network access mode, radio frequency power consumption, and network service quality.

14. The server of claim 7, wherein the processor is further configured to determine the network access mode of the terminal according to the predicted Internet access fee of the available network access mode, radio frequency power consumption, and network service quality.

15. The method of claim 1, wherein the geographical location information of the terminal is obtained by using a GPS positioning technology, a Wi-Fi positioning technology, a base station positioning technology, or an inertial navigation technology.

16. The method of claim 1, wherein the geographical location information comprises an activity area of the user, and wherein the activity area comprises a work area, a living area, or a commute area.

17. The server of claim 5, wherein the geographical location information of the terminal is obtained by using a GPS positioning technology, a Wi-Fi positioning technology, a base station positioning technology, or an inertial navigation technology.

18. The server of claim 5, wherein the geographical location information comprises an activity area of the user, and wherein the activity area comprises a work area, a living area, or a commute area.

19. The terminal of claim 9, wherein the geographical location information of the terminal is obtained by using a GPS positioning technology, a Wi-Fi positioning technology, a base station positioning technology, or an inertial navigation technology.

20. The terminal of claim 9, wherein the geographical location information comprises an activity area of the user, and wherein the activity area comprises a work area, a living area, or a commute area.

* * * * *